United States Patent [19]

Franklin et al.

[11] Patent Number: 5,267,532
[45] Date of Patent: Dec. 7, 1993

[54] PH-INDICATING MATERIAL AND CAT LITTER CONTAINING SAME

[75] Inventors: Lanny U. Franklin, Flowery Branch, Ga.; Mary E. Sachs, Palatine, Ill.

[73] Assignees: Anitox Corporation, Buford, Ga.; American Colloid Company, Arlington Heights, Ill.

[21] Appl. No.: 878,753

[22] Filed: May 5, 1992

[51] Int. Cl.$^5$ ............................................. A01K 1/015
[52] U.S. Cl. .................................. 119/173; 119/171; 422/56; 436/163
[58] Field of Search ............... 119/171, 172, 173, 170, 119/169; 422/56; 436/163, 169

[56] References Cited

U.S. PATENT DOCUMENTS

| | | | |
|---|---|---|---|
| 3,051,661 | 8/1962 | Collins | 436/163 |
| 3,774,455 | 11/1973 | Seidler et al. | 73/444 |
| 3,978,818 | 9/1976 | Heldenbrand | 119/1 |
| 3,994,821 | 11/1976 | Seidenberger | 252/192 |
| 4,009,685 | 3/1977 | Kliment et al. | 119/1 |
| 4,013,414 | 3/1977 | Lavallee et al. | 436/163 |
| 4,179,397 | 12/1979 | Rohowetz et al. | 252/408 |
| 4,326,481 | 4/1982 | Gruss | 119/1 |
| 4,407,960 | 10/1983 | Tratnyek | 436/ |
| 4,568,518 | 2/1986 | Wolfbeis et al. | 436/163 |
| 4,587,101 | 5/1986 | Marsoner et al. | 433/56 |
| 4,671,208 | 6/1987 | Smith | 119/1 |
| 4,685,420 | 8/1987 | Stuart | 119/1 |
| 4,732,849 | 3/1988 | Seshimoto et al. | 422/56 |
| 4,736,706 | 4/1988 | Lang | 119/1 |
| 4,827,944 | 5/1989 | Nugent | 128/771 |
| 4,865,761 | 9/1989 | Mandel et al. | 252/190 |
| 4,925,826 | 5/1990 | Hamm et al. | 502/407 |
| 5,014,650 | 5/1991 | Sowle et al. | 119/171 |
| 5,049,358 | 9/1991 | Lau | 422/56 |
| 5,062,383 | 11/1991 | Nelson | 119/173 |
| 5,064,615 | 11/1991 | Mangold et al. | 436/163 |
| 5,077,222 | 12/1991 | Lau | 436/88 |
| 5,143,023 | 9/1992 | Kuhns | 119/173 |
| 5,146,877 | 9/1992 | Jaffee et al. | 119/172 |

FOREIGN PATENT DOCUMENTS

| | | |
|---|---|---|
| 4028933C2 | 7/1992 | Fed. Rep. of Germany . |
| 284660 | 12/1986 | Japan ............ 436/163 |
| 9109515 | 7/1991 | World Int. Prop. O. ........ 119/171 |

OTHER PUBLICATIONS

Product Literature of KleanHeart Pet Products entitled "Fussy Cat Health Monitor Cat Litter".
Product literature of KleanHeart Pet Products entitled "Fussy CatD The Only Feline Urinary-Indicating Cat Litter".
Product literature of CatScan TM entitled "Now Making A House Call Is As Easy As Recommending Cat-Scan. TM"

*Primary Examiner*—John G. Weiss
*Attorney, Agent, or Firm*—Marshall, O'Toole, Gerstein, Murray & Borun

[57] ABSTRACT

A pH-indicating material capable of undergoing a clearly visually detectable color transition at a desired pH, e.g., at a pH at or below about 5.6 and/or at a pH at or above about 7.6. When the pH-indicating material is wetted on its surface with liquid animal dross, particularly animal urine, such as cat urine, the pH-indicating material will undergo a clearly visible color transition at a urine-problematic pH, e.g., acidic or alkaline. The pH-indicating material is maintained on an inert carrier, separate from the cat litter material itself, so that the cat litter material does not chemically interfere with the urine pH-induced color transition provided by the dye(s) in the coating material, and so that the color transition is an exclusive result of the pH of the contacting animal urine, without pH interference from the litter material. In a preferred embodiment, the pH-indicating material is admixed with any cat litter material and has dual indicators that provide one color transition at a low pH and a different color transition at a high pH so that acidic or alkaline animal urine problems can be visibly detected upon contact between the animal urine and the pH-indicating material.

30 Claims, No Drawings

PH-INDICATING MATERIAL AND CAT LITTER CONTAINING SAME

FIELD OF THE INVENTION

The present invention is directed to a pH-indicating material formed from an inert carrier coated with a water-soluble polymer film containing one or more pH-indicating dyes. More particularly, the present invention is directed to an inert carrier material having a dried film of a water-soluble polymer containing one or more pH-indicating dyes, particularly two pH-indicating dyes, one dye undergoing a visibly detectable color transition below about pH 5.6 and the other dye undergoing a visibly detectable color transition at a pH of about 7.4, particularly useful as an additive for cat litter as an indication of cat urine having an acidic pH (below about pH 5.6) or an indication of feline urologic syndrome (FUS) at a cat urine pH of about 7.4 and above.

BACKGROUND OF THE INVENTION AND PRIOR ART

The commercial cat litter industry has undergone substantial change since the introduction of clumping bentonite clay cat litters as disclosed in the Hughes U.S. Pat. No. 5,000,115, hereby incorporated by reference. As disclosed in the Hughes '115 patent, bentonite clay cat litter that is wetted with cat urine will agglomerate into a clump having sufficient structural integrity so that the agglomerated clump can be removed from a cat litter box, thereby removing the cat urine, as well as feces, with a slotted scoop. The remainder of the unsoiled cat litter material can remain in the litter box for reuse without generation of odor over substantial periods of time of one year or more.

Some of the patents that disclose the use of clay as an absorbent pet litter material are as follows: Crampton, et al. U.S. Pat. No. 4,657,881; Stuart U.S. Pat. No. 4,685,420; McFadden U.S. Pat. No. 3,286,691; Japanese published patent applications J5 8009-626, J6 3044-823-A; J6 0094-043-A; J6 3185-323-A, J6 2239-932-A, and JO 1191-626-A; German DE 3620-447-A; Ducharme, et al. U.S. Pat. No. 4,844,010; Kumar U.S. Pat. No. 4,343,751; and Jaffee, et al. U.S. Pat. No. 4,459,368. The following U.S. patents teach pet litters that include additives, e.g., polymers for clumping, or odor control additives: U.S. Pat. No. Lang U.S. Pat. No. 4,736,706; Smith U.S. Pat. No. 4,671,208; Stuart U.S. Pat. No. 4,685,420, Sowle, et al. U.S. Pat. No. 5,014,650; and Nelson U.S. Pat. No. 5,062,383.

In addition to a good portion of the cat litter industry moving toward the use of clumping bentonite clay cat litters, others have attempted to provide additional improvements to cat litter material for the purpose of providing a home diagnostic means and/or a home animal health monitoring means to quickly monitor the health of a cat at home, by the use of feline urine screening tests. One of these home feline urine screening tests presently is marketed under the trademark CAT-SCAN TM — a finely divided solid substance that is sprinkled from a package onto the surface of the cat litter from one of four different packages, each having an indicator dye indicative of one of: blood, pH, protein or glucose contained in the cat urine.

Another commercial cat litter product, called FUSSY CAT D, is a clumping, clay cat litter material that includes a pH-indicating dye bound to the clay material during manufacture of the cat litter and having a color transition at an a alkaline pH indicative of feline urologic syndrome.

U.S. patents uncovered that disclose the use of a pH indicator in connection with an absorbent product or a polymeric substance include Seidenberger U.S. Pat. No. 3,994,821; Rohowetz U.S. Pat. No. 4,179,397; Tratnyek U.S. Pat. No. 4,407,960; and Marsoner, et al. U.S. Pat. No. 4,587,101. Mandel, et al. U.S. Pat. No. 4,865,761 discloses mineral-based, clay-containing absorbent material for absorbing hazardous, acidic spills. Hamm, et al. U.S. Pat. No. 4,925,826 discloses a mineral-based absorbent material for the absorption of animal excrement. Gruss U.S. Pat. No. 4,326,481 discloses a granular material useful in taking a urine sample from a cat; Nugent U.S. Pat. No. 4,827,944 and Seidler, et al. U.S. Pat. No. 3,774,455 disclose urine collection and testing devices.

One of the problems associated with combining one or more pH-indicating dyes with a clay-based cat litter material is that clay litter materials include a number of exchangeable metallic cations and other chemical species that, when in contact with cat urine, may alter the pH of the cat urine, or otherwise interfere with the color transition of indicator dyes within the pH range that a color transition should be indicated, thereby providing false urine pH information. Further, attempts to provide pH indicators as a coating material onto the surface of clay cat litter material during manufacture have not been entirely successful since the dyes, particularly the water-soluble dyes that are indicative of pH of cat urine within a desired pH range, are substantially absorbed into the interior of the clay particles and, therefore, any color transition that occurs within the interior of a clay cat litter particle is difficult if not impossible to perceive visually, particularly for the water-swellable bentonite clays.

The pH-indicating materials and the cat litter material containing the pH-indicating materials of the present invention overcome the deficiencies of the pH-indicating cat litter materials of the prior art by providing the pH indicator(s) within a dried film of water-soluble polymer dried onto a solid, inert carrier material. In this manner, when the film coating on the inert carrier material is wetted with cat urine, the urine penetrates the polymeric film and the water-soluble pH-indicating dye(s) are solubilized within the cat urine to provide an easily detectable color transition on the surface of the inert carrier material without interference from any pH interaction or dye interaction from the cat litter material itself.

SUMMARY OF THE INVENTION

In brief, the present invention is directed to a pH-indicating material capable of undergoing a clearly visually detectable color transition at a desired pH, e.g., at a pH at or below about 5.6 and/or at a pH at or above about 7.4. When the pH-indicating material is wetted on its surface with liquid animal dross, particularly animal urine, such as cat urine, the pH-indicating material will undergo a clearly visible color transition at a urine-problematic pH, e.g., acidic or alkaline. The pH-indicating material is maintained on an inert carrier, separate from the cat litter material itself, so that the cat litter material does not chemically interfere with the urine pH-induced color transition provided by the dye(s) in the coating material, and so that the color transition is an exclusive result of the pH of the contacting that animal urine, without pH interference from the litter material.

The pH-indicating material of the present invention is manufactured such that the pH-indicating dyes are bound to a water-penetrable (water-soluble) polymer and the dye(s) and polymer are coated over an inert, preferably non-water-absorbent carrier material. In this manner, the pH-indicating dye(s) are held on a surface of the inert carrier material within a dried film of the water-soluble polymer. In a preferred embodiment, the pH-indicating material of the present invention is admixed with any cat litter material and has dual indicators that provide one color transition at a low pH and a different color transition at a high pH so that acidic or alkaline animal urine problems can be visibly detected when the animal urine contacts the pH-indicating material of the present invention. In the preferred embodiment, the pH-indicating material of the present invention is admixed with any cat litter material in an amount of about 5% to about 20% by volume, preferably about 10% to about 15% by volume, based on the total volume of the litter material containing the pH-indicating material.

Accordingly, one aspect of the present invention is to provide a dye-coated inert carrier material capable of undergoing a visually detectable color transition when wetted with an aqueous solution, e.g, cat urine, at a pH of about 5.6 or below.

Another aspect of the present invention is to provide a dye-coated inert carrier material including a pH-indicating dye coated on an exterior surface of the inert carrier material within a water-soluble polymeric binder and capable of undergoing a visually detectable color transition at a pH of about 7.6 or above.

Another aspect of the present invention is to provide a pH-indicating additive material capable of incorporation into any powdered or granular material and capable of undergoing a visually detectable color transition when wetted with an aqueous acidic liquid, e.g., having a pH below about 6.0; and also capable of undergoing a different, visually detectable color transition when wetted with an aqueous alkaline liquid, e.g., having a pH above about 7.5.

Still another aspect of the present invention is to provide an inert carrier material that includes one or more pH-indicating dyes bound to the surface of the inert carrier within a film of water-penetratable or water-soluble polymer such that the dyes are sufficiently adhered to the inert carrier material such that upon wetting with liquid animal dross, the dye(s) will not be washed away from the carrier material but will maintain in contact with the carrier material so that the color transition in the pH-indicating dye will be easily visually detectable and will remain concentrated on the surface of the inert carrier material.

The above and other aspects and advantages of the present invention will become more apparent from the following detailed description of the preferred embodiments.

DETAILED DESCRIPTION OF THE PREFERRED EMBODIMENTS

The pH-indicating material, cat litter material and methods of the present invention are provided by coating a carrier material, preferably non-water-absorbent, with a film or coating of a aqueous solution of one or more water-soluble pH-indicating dyes and one or more water-soluble polymers and drying the coating material to secure the pH-indicating dye(s) to an exterior surface of the inert coating material When the dye-coated inert carrier material is wetted with a liquid animal dross, e.g., cat urine, the water-soluble polymer is at least partially solubilized, together with the dye(s), to provide a visually detectable color transition if the pH of the liquid animal dross is above a predetermined value, e.g., 7.6, and/or below a predetermined value, e.g., 5.6, without the pH of the cat urine being falsely changed by interaction with the cat litter surrounding the pH-indicating material, and without undesirable interactions between the cat litter and the indicating dye(s).

The inert carrier material or substrate that forms a core of the pH-indicating material of the present invention can be any material that, when wetted with water, does not liberate acid or base ions which would interfere with the pH of animal urine. Any resulting color transition is thereby effected only by the contact of the animal urine with the dissolved pH-indicating dye within the coating layer applied over the inert carrier, as will be described in more detail hereinafter. Accordingly, a wide variety of inert carrier substrates can be provided in accordance with the features of the present invention.

It is preferred that the inert carrier material have a light color (reflective color) so that the inert carrier does not interfere with the visual detection of color transition taking place in the dyes contained in the polymeric coating, as seen on the surface of the material through a transparent or translucent water-soluble polymeric binder. Accordingly, it is preferred that the inert carrier material have a reflective surface, such as white calcium carbonate chips, as obtained from the cutting to size of calcium carbonate marble slabs. Preferably, the inert substrate has a light reflectance of at least 20%, preferably at least 50% for easier detection of color transition. Calcium carbonate marble chips are inert to the extent that they do not materially alter the pH point at which a pH-indicating dye coating will undergo a color transition, when wetted with an acidic or alkaline animal urine. It is preferred that the inert carrier substrate is non-water-absorbent so that the inert carrier substrate can be more easily coated with a water-soluble polymer/dye composition while maintaining the dye on the exterior surface of the inert carrier. However, water-absorbent inert carrier materials also can be used with some waste of water-soluble polymer/water-soluble dye composition since some of the aqueous polymer/dye solution will be absorbed into the interior of an absorbent inert carrier substrate.

Another example of suitable inert carrier substrates includes beads of water-insoluble polymer material, such as highly cross-linked sodium polyacrylate; beads of polyethylene, polypropylene, polystyrene, and the like. Any other granite chips and other wood chips, cereal grains and the like, also are suitable as the core substrate in forming the pH-indicating material of the present invention.

The size and shape of the inert carrier material are not particularly important in accordance with the principles of the present invention. However, in the preferred embodiment, the pH-indicating materials of the present invention are added to clumping cat litter material, as disclosed in Hughes U.S. Pat. No. 5,000,115 and, accordingly, for this preferred cat litter material, the size of the finished pH-indicating material additive of the present invention should be within the range of the preferred cat litter particle size, or about 50 microns to about 3350 microns. Other sizes for the inert carrier material can be used so long as some of this pH-indicating material remains near a surface of the cat litter material so that it can be wetted by liquid animal dross, e.g., cat litter urine, each time the animal urinates onto the surface of the litter material.

If the pH-indicating material of the present invention is hand-sprinkled onto the surface of a cat litter material, as is contemplated in accordance with the principles of the present invention, the only consideration in terms of size and shape of the inert carrier material is that a sufficient amount of the pH-indicating material of the present invention is distributed over the surface of the cat litter material so that urine contact will be made each time the animal urinates in the litter material.

In accordance with an important feature of the present invention, at least one and preferably two pH-indicating dyes are coated over a surface of the inert carrier substrate and sealed to the substrate surface within a water-soluble polymer coating material that is applied from aqueous solution and then is dried onto the inert substrate surface to secure the dye(s) in place. The water-soluble polymer/water-soluble dye aqueous solution conveniently is prepared by dissolving the water-soluble polymer(s) into water heated to at least the solubilization temperature of the water-soluble polymer, and thereafter adding one or more water-soluble dyes to the aqueous polymer solution. Alternatively, the dye(s) can be dissolved in water first, and thereafter the aqueous dye solution can be heated to at least the solubilization temperature of the polymer(s) to dissolve the polymer(s) into the aqueous dye solution. It is preferred to incorporate only a small excess of water into the coating composition, enough to assure complete solubilization of the water-soluble polymer(s) and complete solubilization of the water-soluble dye(s) while minimizing the amount of drying necessary after coating the inert substrate material with the aqueous polymer/dye composition.

The preferred water-soluble polymer is polyvinylpyrrolidone (PVP) having a monomeric structure as follows:

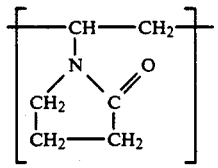

The water-solubility of PVP can be adjusted according to (1) the degree of hydrolysis of the polyvinylpyrrolidone to take into account different thicknesses of PVP/dye films applied over the inert substrate, and (2) by forming a metal salt of PVP, such as sodium or potassium. It is preferred that at least 50% of the PVP monomeric units are hydrolyzed to the structure:

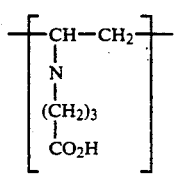

and that the PVP be used in the salt form, e.g., sodium or potassium polyvinylpyrrolidone and that the polymer/dye aqueous composition is coated over the inert substrate in a thickness of about 5 mils to about 25 mils, preferably about 10 mils to about 20 mils. Such PVP coatings provide immediate partial solubility of the polymer when wetted with animal urine while maintaining the interaction of the animal urine and dye on the surface of the inert substrate. The color transition, concentrated on the surface of the inert substrate, provides surprisingly spectacular color development and intensity over a few hours to a few days with improved color resolution and differentiation on the surface of the inert substrate. The molecular weight of the PVP polymer is not critical so long as the PVP is water-soluble. Excellent results can be obtained with PVP having weight average molecular weights in the range of about 225 to about 1,000,000 or more, preferably about 2,000 to about 100,000.

Other PVP derivatives that are water-soluble and function well as the binding polymer for binding one or more water-soluble dyes to the surface of an inert substrate include the following: N-Methylpyrrolidone (NMP); N-Ethylpyrrolidone (NEP); and N-Vinylpyrrolidone, having the structures:

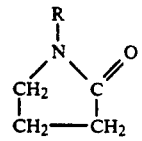

NMP: R = CH$_3$
NEP: R = CH$_3$CH$_2$
NVP: R = CH$_2$:CH

Other substituted water-soluble pyrrolidones useful in accordance with the present invention include: N-isopropyl-5-methylpyrrolidone; pyrrolidone-N-acetic acid; N-cyclohexyl-pyrrolidone; and hexamethylene-bis(2-pyrrolidone). It appears that best results for polyvinylpyrrolidone and its derivatives are achieved when the PVP has about 80% to about 90% of its monomer units hydrolyzed.

Other water-soluble polymers useful as binders in the aqueous polymer/dye coating composition include poly(ethylene oxide) having monomer units;

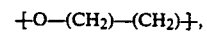

hereinafter PEO; available as PLURACOL E from Wyandote, and POLYOX WSR or CARBOWAX from Union Carbide—water-soluble even at the very high molecular weights, e.g., 1,000,000 or more; poly(propylene oxide), having monomer units:

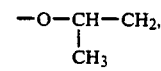

water-soluble only in the oligomer form, having weight average molecular weights from about 100 to about 1,000, preferably about 100 to about 500; poly(vinyl methyl ether), having monomer units:

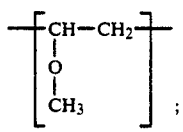

and their hydrolysis product derivatives. Poly(vinyl methyl ether) is water-soluble and available commercially as GANTREZ M from GAF Corporation and is water-soluble, like PEO, at room temperature, at very high molecular weights, e.g., from about 120 to about 1,000,000 and more. Another suitable water-soluble polymer is polyoxymethylene (POM), having monomer units

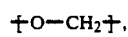

which are water-soluble in the very short oligomer form, i.e., poly(formaldehyde) and having a melting point of about 180° C., and weight average molecular weights from about 40 to about 400. Oxide copolymers also are suitable as the water-insoluble binding polymer, including random and block copolymers of poly(ethylene oxide) with a variety of monomers, including propylene oxide and/or poly(propylene oxide). One particularly useful copolymer is sold as PLURONIC F68 having a poly(propylene oxide) core molecular weight of about 1,800 and including 80% w/w ethylene oxide units, giving a combined molecular weight for the two outer poly(ethylene oxide) sections of 6,600—for a combined weight average molecular weight of 8,400.

The polyacrylic acid polymers are also suitable, having monomer units:

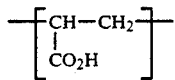

and are commercially available as CARBOPOL resins from B. F. Goodrich and PRIMAL resins from Rohm & Haas. Light cross-linking will slightly hinder the water-solubility for better adherence of the polymer and dyes to the inert substrate.

Other, water-soluble derivatives of, and substituted, polyacrylic acid also are useful in accordance with the present invention, such as poly(methacrylic acid), (PMAA), having a monomeric structure:

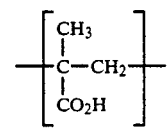

Similar water-soluble polymers that are suitable in accordance with the present invention include poly(methacrylamide), or PMAAm, having the general monomeric structure:

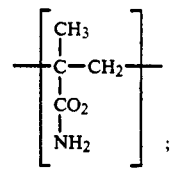

Poly(N,N-Dimethylacrylamide), having the general monomeric structure:

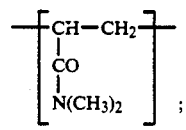

Poly(N-Isopropylacrylamide), or PIPAAm, having the monomeric structure:

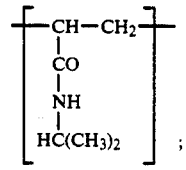

Poly(N-acetamidoacrylamide), having a monomeric structure:

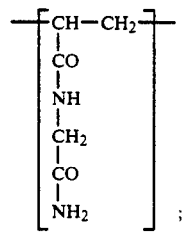

and Poly(N-acetmidomethacrylamide), having a monomeric structure:

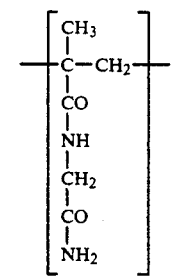

Water-soluble copolymers including any one or more of the above-described acrylic polymers also are useful in accordance with the principles of the present inventions, including the acrylic interpolymers of polyacrylic acid and poly(methacrylic acid); polyacrylic acid with poly(methacrylamide); and polyacrylic acid with methacrylic acid.

suitable water-soluble vinyl polymers include poly(vinyl alcohol):

poly(vinyl acetate):

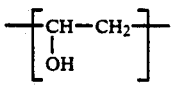

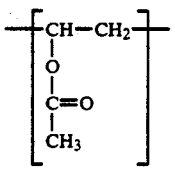

and their copolymers, e.g., poly(vinylacetate-co-vinyl alcohol):

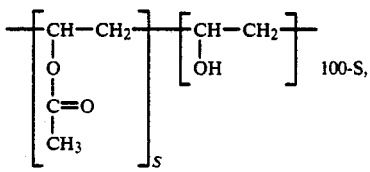

also known as partially hydrolyzed poly(vinylacetate) or partially acetylated poly(vinyl alcohol), available commercially from DuPont as ELVANOL and from Airco Chemical as VINOL.

Other suitable water-soluble polymers include polyvinyloxazolidone (PVO) and polyvinylmethyloxazolidone (PVMO), having the monomeric structures:

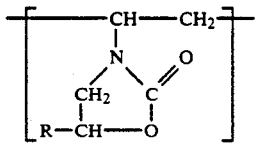

PVO: R = H
PVMO: R = $CH_3$

It has been found that any pH-indicator dye can be used in the method of the present invention, provided that if two dyes are combined, one is capable of interacting with cat urine over an acid pH range, with the other changing color over an alkaline pH range to undergo a sufficient and contrasting color transition over the different pH ranges.

The pH-indicating dye(s) used with the binder polymer can be any indicating dye(s) and are chosen for the particular pH range in which a color transition is desired. For use in detecting animal health problems associated with acidic gastrointestinal symptoms that result in incomplete assimilation of nutrients and vitamins, methyl red has been found to provide the best, most distinct color transition from yellow (neutral) to red (acid), with the transition from yellow to red at the problematic pH, occurring from pH 6.3 to about 4.2. When combined with another indicating dye for color transition within another pH range, e.g., alkaline, each dye should be capable of undergoing a distinctly different, visually detectable color transition. Each of the pH-indicator dyes utilized in the composition should undergo a distinctly different color transition at different pH ranges.

In accordance with the method of the present invention, if only one dye is used, the aqueous polymer/dye solution can be buffered to a pH value slightly above or below the pH range wherein the dye changes color, in order for each dye to undergo its maximum color transition, and therefore most appreciably improve color resolution and most substantially increase color transition sensitivity. The quantity of buffer is usually between about 100 millimolar (mM) and about 500 millimolar.

Finally, if two dyes are incorporated into the aqueous polymer/dye coating composition, the dyes employed in the composition should undergo color transitions that do not mutually interfere with one another. For example, the benefits of improved color resolution and increased color sensitivity can be defeated or minimized if a first dye undergoes a color transition to match the original color of a second dye; or if the second dye undergoes a color transition to match the original color of the first dye. For example, if at a constant pH the first dye is red in color and the second dye is colorless; then upon interaction with animal urine, the first dye undergoes a color transition from red to colorless and the second dye undergoes a color transition from colorless to red, the benefits of improved color resolution and sensitivity are diminished or negated. The relative amounts of combined dyes are not important.

It should be understood that optional ingredients, such as surfactants, that do not materially alter the nature and the function of the indicator dyes and that do not interfere with the pH of the contacting urine, also can be included in the aqueous polymer/dye coating composition. Likewise, other such non-essential ingredients include nonactive background dyes, polymers and plasticizers.

In accordance with an important feature of the present invention, TABLE I lists representative pH-indicator dyes, and their pH color transition ranges, and preparations that can be used, singularly or in admixture, in the aqueous polymer/dye coating compositions of the present invention. The combination of methyl red and bromothymol blue provide exceptional results for a fast and long-lasting indication of acidic or alkaline cat urine. Methyl red has a red color about pH 6.0 and changes from red to yellow through the pH range 6.0 to 4.8. Bromothymol blue has a yellow color below pH 6.0 and changes from yellow to blue through the pH range 6.0 to 7.6.

A combination of methyl red and bromothymol blue will appear orange when viewed through the transparent or translucent polymeric binder. When animal urine has a problematic acidic pH, below about 6.0, e.g., 5.0, the methyl red will change from yellow to red (the same as the bromothymol blue). Accordingly, a red appearance indicates a problematic acidic urine. When animal urine has a problematic alkaline pH, indicative of feline urologic syndrome, e.g., pH 7.5 to 8.0, the bromothymol blue will change from yellow to blue or purple and, combined with the yellow colored methyl red, the combination of pH-indicators will appear green to violet colored. Surprisingly, once the color changes on the surface of the inert core substrate, the color change remains for days for viewing by the pet owner, although methyl red is easily reduced and, when not bound by the polymers of the present invention, quickly loses its color necessitating prompt readings. It is theorized that the water-soluble polymer binders stabilize or lock the pH-indicating dyes against chemical degradation and, upon polymer solubilization, permit dye color change while wet and the polymer will quickly dry to again stabilize the dyes, in their new color, against chemical degradation.

TABLE I

| INDICATOR | APPROXIMATE pH RANGE | COLOR-CHANGE | PREPARATION |
|---|---|---|---|
| Methyl Violet | 0.0–1.6 | yel to bl | 0.01–0.05% in water |
| Crystal Violet | 0.0–1.8 | yel to bl | 0.02% in water |
| Ethyl Violet | 0.0–2.4 | yel to bl | 0.1 g in 50 ml of MeOH + 50 ml in water |
| Malachite Green | 0.2–1.8 | yel to bl grn | water |
| Methyl Green | 0.2–1.8 | yel to bl | 0.1% in water |
| 2-(p-dimethylamino-phenylazo)pyridine | 0.2–1.8 4.4–5.6 | yel to bl red to yel | 0.1% in EtOH |
| o-Cresolsulfone-phthalein (Cresol Red) | 0.4–1.8 7.0–8.8 | yel to red yel to red | 0.1 g in 26.2 ml 0.01N NaOH + 223.8 ml water |
| Quinaldine Red | 1.0–2.2 | col to red | 1% in EtOH |
| p-(p-dimethylamino-phenylazo)-benzoic acid, Na-salt (Paramethyl Red) | 1.0–3.0 | red to yel | EtOH |
| m-(p-anilnophenylazo) benzene sulfonic acid, Na-salt (Metanil Yellow) | 1.2–2.4 | red to yel | 0.01% in water |
| 4-Phenylazodiphenyl-amine | 1.2–2.6 | red to yel | 0.01 g in 1 ml 1N HCl + 50 ml EtOH + 49 ml water |
| Thymolsulfonephthalein (Thymol Blue) | 1.2–2.8 8.0–9.6 | red to yel yel to bl | 0.1 g in 21.5 ml 0.01N NaOH + 229.5 ml water |
| m-Cresolsulfone-phthalein (Metacresol Purple) | 1.2–2.8 7.4–9.0 | red to yel yel to purp | 0.1 g in 26.2 mol 0.01N NaOH + 223.8 ml water |
| p-(p-anilinophenylazo) benzenesulfonic acid, Na-Salt (Orange IV) | 1.4–2.8 | red to yel | 0.01% in water |
| 4-o-Tolylazo-o-toluidine | 1.4–2.8 | or to yel | water |
| Erythrosine, disodium salt | 2.2–3.6 | or to red | 0.1% in water |
| Benzopurpurine 48 | 2.2–4.2 | vt to red | 0.1% in water |
| N,N-dimethyl-p-(m-tolylazo)aniline | 2.6–4.8 | red to yel | 0.1% in water |
| 4,4′-Bix(2-amino-1-naphthylazo)2,2′-stil-benedisulfonic acid | 3.0–4.0 | purp to red | 0.1 g in 5.9 ml 0.05N NaOH + 94.1 ml water |
| Tetrabromophenol-phthaleinethyl ester, K-salt | 3.0–4.2 | yel to bl | 0.1% in EtOH |
| 3′,3″,5′,5″-tetrabromo-phenolsulfonephthalein (Bromophenol Blue) | 3.0–4.6 | yel to bl | 0.1 g in 14.9 ml 0.01N NaOH + 235.1 ml water |
| 2,4-Dinitrophenol | 2.8–4.0 | col to yel | saturated water solution |
| N,N-Dimethyl-p-phenyl-azoaniline (p-Dimethylamino-azobenzene) | 2.8–4.4 | red to yel | 0.1 g in 90 ml in EtOH + 10 ml water |
| Congo Red | 3.0–5.0 | blue to red | 0.1% in water |
| Methyl Orange-Xylene Cyanole solution | 3.2–4.2 | purp to grn | ready solution |
| Methyl Orange | 3.2–4.4 | red to yel | 0.01% in water |
| Ethyl Orange | 3.4–4.8 | red to yel | 0.05–0.2% in water or aqueous EtOH |
| 4-(4-Dimethylamino-1-naphthylazo)-3-methoxybenzenesulfonic acid | 3.5–4.8 | vt to yel | 0.1% in 60% EtOH |
| 3′,3″,5′,5″-Tetrabromo-m-cresolsulfone-phthalein (Bromocresol Green) | 3.8–5.4 | yel to blue | 0.1 g in 14.3 ml 0.01N NaOH + 235.7 ml water |
| Resazurin | 3.8–6.4 | or to vt | water |
| 4-Phenylazo-1-naphthylamine | 4.0–5.6 | red to yel | 0.1% in EtOH |
| Ethyl Red | 4.0–5.8 | col to red | 0.1 g in 50 ml MeOH + 50 ml water |
| 2-(p-Dimethylamino-phenylazo)-pyridine | 0.2–1.8 4.4–5.6 | yel to red red to yel | 0.1% in EtOH |

TABLE I-continued

| INDICATOR | APPROXIMATE pH RANGE | COLOR CHANGE | PREPARATION |
|---|---|---|---|
| 4-(p-ethoxyphenylazo)-m-phenylenediamine monohydrochloride | 4.4–5.8 | or to yel | 0.1% in water |
| Lacmoid | 4.4–6.2 | red to bl | 0.2% in EtOH |
| Alizarin Red S | 4.6–6.0 | yel to red | dilute solution in water |
| Methyl Red | 4.8–6.0 | red to yel | 0.02 g in 60 ml EtOH + 40 ml water |
| Propyl Red | 4.8–6.6 | red to yel | EtOH |
| 5',5''-Dibromo-o-cresolsulfone-phthalein (Bromocresol Purple) | 5.2–6.8 | yel to purp | 0.1 g in 18.5 ml 0.01N NaOH + 231.5 ml water |
| 3',3''-Dichlorophenol-sulfonephthalein (Chlorophenol Red) | 5.2–6.8 | yel to red | 0.1 g in 23.6 ml 0.01N NaOH + 226.4 ml water |
| p-Nitrophenol | 5.4–6.6 | col to yel | 0.1% in water |
| Alizarin | 5.6–7.2<br>11.0–12.4 | yel to red<br>red to purp | 0.1% in MeOH |
| 2-(2,4-Dinitrophenylazo)-1-naphthol-3,6-disulfonic acid, di-Na salt | 6.0–7.0 | yel to bl | 0.1% in water |
| 3',3''-Dibromothymolsulfonephthalein (Bromothymol Blue) | 6.0–7.6 | yel to bl | 0.1 g in 16 ml 0.01N NaOH + 234 ml water |
| 6,8-Dinitro-2,4-(1H)quinazolinedione (m-Dinitrobenzoylene urea) | 6.4–80 | col to yel | 25 g in 115 ml M NaOH + 50 ml boiling water 0.292 g of NaCl in 100 ml water |
| Brilliant Yellow | 6.6–7.8 | yel to or | 1% in water |
| Phenolsulfonephthalein (Phenol Red) | 6.6–8.0 | yel to red | 0.1 g in 28.2 ml 0.01N NaOH + 221.8 ml water |
| Neutral Red | 6.8–8.0 | red to amb | 0.01 g in 50 ml EtOH + 50 ml water |
| m-Nitrophenol | 6.8–8.6 | col to yel | 0.3% in water |
| o-Cresolsulfone-phthalein (Cresol Red) | 0.0–1.0<br>7.0–8.8 | red to yel<br>yel to red | 0.1 g in 26.2 ml 0.01N NaOH + 223.8 ml water |
| Curcumin | 7.4–8.6<br>10.2–11.8 | yel to red | EtOH |
| m-Cresolsulfone-phthalein (Metacresol Purple) | 1.2–2.8<br>7.4–9.0 | red to yel<br>yel to purp | 0.1 g in 26.2 ml 0.01N NaOH + 223.8 ml water |
| 4,4'-Bis(4-amino-1-naphthylazo) 2,2' stilbene disulfonic acid | 8.0–9.0 | bl to red | 0.1 g in 5.9 ml 0.05 N NaOH + 94.1 ml water |
| Thymolsulfonephthalein (Thymol Blue) | 1.2–2.8<br>8.0–9.6 | red to yel | 0.1 g in 21.5 ml 0.01N NaOH + 228.5 ml water |
| o-Cresolphthalein | 8.2–9.8 | col to red | 0.04% in EtOH |
| p-Naphtholbenzene | 8.2–10.0 | or to bl | 1% in dil. alkali |
| Phenolphthalein | 8.2–10.0 | col to pink | 0.05 g in 50 ml EtOH + 50 ml water |
| Ethyl-bis(2,4-dimethylphenyl)acetate | 8.4–9.6 | col to bl | saturated solution in 50% acetone alcohol |
| Thymolphthalein | 9.4–10.6 | col to bl | 0.04 g in 50 ml EtOH + 50 ml water |
| 5-(p-Nitrophenylazo) salicylic acid, Na-salt (Alizarin Yellow R) | 10.1–12.0 | yel to red | 0.01% in water |
| p-(2,4-Dihydroxyphenylazo) benzenesulfonic acid, Na-salt | 11.4–12.6 | yel to or | 0.1% in water |
| 5,5'-Indigodisulfonic acid, di-Na salt | 11.4–13.0 | bl to yel | water |
| 2,4,6-Trinitrotoluene | 11.5–13.0 | col to or | 0.1–0.5% in EtOH |
| 1,3,5-Trinitrobenzene | 12.0–14.0 | col to or | 0.1–0.5% in EtOH |
| Clayton Yellow | 12.2–13.2 | yel to amb | 0.1% in water |

Other indicator dyes, capable of undergoing a color transition either in the acidic or in the neutral to alkaline pH range, also can be combined to yield a dual indicator reagent composition to afford improved color resolutions and differentiation and increased color sensitivity. However, each indicator dye of a combination of dyes must undergo sufficiently different color transitions over different pH ranges. In addition, several other suitable pH-indicator dyes are available commercially from numerous manufacturers and distributors.

While any solid material can be used for the core of the pH-indicating material of the present invention, it has been found that solid mineral matter, such as marble chips or granite chips, crushed stones, and the like, preferably less than about ⅛ inch in every dimension, functions best as the core or substrate that is coated with the aqueous polymer/dye solutions. It is preferred that the solid, mineral core material is not a clay material because of the potential for interaction between the clay and the pH-indicator dyes. The solid mineral material can be chosen to have a specific gravity approximating (±25%, preferably ±10%) the specific gravity of an absorbent cat litter material with which the pH-indicating material is admixed to prevent substantial separation of the pH-indicating material from the litter material.

For clumping bentonite clay cat litter, granite chips or marble chips are preferred so that the polymer/dye-coated chips can be admixed so with the bentonite clay particles, usually having a size from about 50 microns to about 4,000 microns, preferably about 50 microns to about 3350 microns, and homogeneously blended with the bentonite clay particles. Storage, transportation and handling of the homogeneously blended bentonite clay/pH-indicating material composition of the present invention will not cause substantial separation of the coated mineral chips from the bentonite clay animal litter material so that the coated chips are available for animal urine contact simply by pouring the blended material into a litter box, or other area where the animal urinates.

Best results are achieved by coating a solid mineral-based core substrate, preferably $CaCO_3$ marble chips, with an aqueous solution containing about 20% to about 60%, preferably about 30% to about 50%, e.g., about 40% by weight water and approximately 58% by weight sodium polyvinylpyrrolidone that has 80% to 90% of its monomer units hydrolyzed, with about 2% by weight sodium dodecyl sulfate surfactant added for better adhesion of the polymer/dye composition to the exterior of the marble chips. The preferred indicator dyes are a combination of methyl red and bromothylmol blue in a weight ratio of about 3:1. Concentrations of each dye are not critical and can be provided in the concentration indicated in Table I. Preferably, the aqueous composition contains about 0.01% to about 1%, e.g., about 0.05% by weight of a sodium phosphate buffer. The solution can be sprayed onto the surface of the marble chips, or the chips can be dipped into the solution. The coated chips then are heated to about 170° C. to 180° C. (above the melting point of the water-soluble polymer) for about 10 minutes to dry the polymer, protect and hold the dye on the surface of the marble chips, and cure the polymer coating while maintaining water-solubility of the polymer. Higher temperatures above the melting point of the polymer may be used for a shorter time period to achieve drying.

Upon complete drying, the chips are cooled slowly, in a confined chamber, to room temperature, over the course of one to five hours. The coating preferably is applied in a thickness of about 10 to 30 mils. Water-soluble polymers having a high degree of hydrolysis, e.g., 100% hydrolyzed polyvinylpyrrolidone, can be provided in thicker coatings, e.g., 20 mils to 40 mils, and cured at higher temperatures, e.g., 200° C., for drying and curing in a reasonable amount of time. Water-soluble polymers that are less water-soluble, e.g., a partially cross-linked sodium polyacrylate, preferably are provided in a thinner coating, e.g., 5 mils to 10 mils thick, and dried at a lower temperature, e.g., 120° C. to 140° C. Preferably, the water-soluble polymer film will have sufficient resistance to solubilization that the polymer will not be completely washed away from the surface of the substrate or core when doused with cat urine. Degree of cross-linking, if any, degree of hydrolysis, curing temperatures and the like can be varied to vary the ease of solubilization of the polymer film coating.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the composition may be varied substantially without departing from the spirit of the invention, and the exclusive use of all modifications which come within the scope of the appended claims is reserved.

What is claimed is:

1. A pH-indicating material capable of undergoing a color transition upon contact with animal urine having an acidic or alkaline pH comprising:
   an inert core substrate;
   a coating on said substrate formed from an aqueous solution of a water-soluble polymer and an effective amount, for color transition, of a water-soluble pH-indicating dye, dried in place on said core substrate.

2. The pH-indicating material defined in claim 1, wherein the coating includes two pH-indicating dyes, a first dye undergoing a color transition at a pH below about 5.4, and a second dye undergoing a color transition at a pH above of about 7.6; each dye undergoing a color transition to a color that is different from the pH-neutral color of the other dye.

3. The pH-indicating material defined in claim 2, wherein the two dyes are methyl red and bromothymol blue.

4. The pH-indicating material of claim 1, wherein the water-soluble polymer is selected from the group consisting of polyvinylpyrrolidone; hydrolyzed polyvinylpyrrolidone; partially hydrolyzed polyvinylpyrrolidone; N-methylpyrrolidone; N-ethylpyrrolidone; N-vinylpyrrolidone; N-isopropyl-5-methylpyrrolidone; pyrrolidone-N-acetic acid; N-cyclohexyl-pyrrolidone; hexamethylene-bis(2-pyrrolidone); metal salts of the foregoing; poly(ethylene oxide); poly(propylene oxide); poly(vinyl methyl ether); polyoxymethylene; copolymers of ethylene oxide and propylene oxide; polyacrylic acid; fully or partially neutralized metal salts of polyacrylic acid; polymethacrylic acid; fully or partially neutralized metal salts of polymethacrylic acid; poly(methacrylamide); poly(N,N-dimethylacrylamide); poly(N-isopropylacrylamide); poly(N-acetamidoacrylamide); poly(N-acetamidomethacrylamide); acrylic interpolymers of polyacrylic acid and poly(methacrylic acid); acrylic interpolymers of polyacrylic acid and poly(methacrylamide); acrylic interpolymers of polyacrylic acid and methacrylic acid; poly(vinyl alcohol); poly(vinyl acetate); poly(vinylacetate-co-vinyl alcohol); polyvinyloxazolidone; polyvinylmethyloxazolidone; and mixtures of any two or more of the foregoing.

5. The pH-indicating material of claim 1, wherein the dye is included in the aqueous solution in an amount of about 0.01% to about 5% by weight of the aqueous solution.

6. The pH-indicating material of claim 1, wherein the aqueous solution includes about 20% to about 60% by weight water, prior to drying.

7. The pH-indicating material of claim 1, wherein the water-soluble polymer is polyvinylpyrrolidone coated onto said core substrate in a thickness of about 1 mil to about 25 mils.

8. The pH-indicating material of claim 1, wherein the water-soluble polymer is polyvinylpyrrolidone coated onto said core substrate in a thickness of about 3 mils to about 20 mils.

9. The pH-indicating material of claim 1, wherein the water-soluble polymer is polyvinylpyrrolidone coated onto said core substrate in a thickness of about 5 mils to about 15 mils.

10. The pH-indicating material of claim 7, wherein the polyvinylpyrrolidone is partially hydrolyzed.

11. The pH-indicating material of claim 10, wherein the polyvinylpyrrolidone has at least 50% of its monomer units hydrolyzed.

12. The pH-indicating material of claim 11, wherein the polyvinylpyrrolidone has at least 75% of its monomer units hydrolyzed.

13. The pH-indicating material of claim 12, wherein the polyvinylpyrrolidone has about 80% to about 90% of its monomer units hydrolyzed.

14. An animal litter comprising a plurality of water-absorbent particles containing, in combination therewith, about 2% to about 75% by total litter volume of a plurality of discrete particles of pH-indicating material, said pH-indicating material comprising:
an inert core substrate;
a coating on said substrate formed from an aqueous solution of a water-soluble polymer and an effective amount, for color transition, of a water-soluble pH-indicating dye, dried in place on said core substrate.

15. The animal litter of claim 14, wherein the coating includes two pH-indicating dyes, a first dye undergoing a color transition at a pH below about 5.4, and a second dye undergoing a color transition at a pH above of about 7.6; each dye undergoing a color transition to a color that is different from the pH-neutral color of the other dye.

16. The animal litter of claim 14, wherein the two dyes are methyl red and bromothymol blue in a weight ratio of about 3:1, respectively.

17. The animal litter of claim 14, wherein the water-soluble polymer is selected from the group consisting of polyvinylpyrrolidone; hydrolyzed polyvinylpyrrolidone; partially hydrolyzed polyvinylpyrrolidone; N-methylpyrrolidone; N-ethylpyrrolidone; N-vinylpyrrolidone; N-isopropyl-5-methylpyrrolidone; pyrrolidone-N-acetic acid; N-cyclohexyl-pyrrolidone; hexamethylene-bis(2-pyrrolidone); metal salts of the foregoing; poly(ethylene oxide); poly(propylene oxide); poly(vinyl methyl ether); polyoxymethylene; copolymers of ethylene oxide and propylene oxide; polyacrylic acid; fully or partially neutralized metal salts of polyacrylic acid; polymethacrylic acid; fully or partially neutralized metal salts of polymethacrylic acid; poly(methacrylamide); poly(N,N-dimethylacrylamide); poly(N-isopropylacrylamide); poly(N-acetamidoacrylamide); poly(N-acetamidomethacrylamide); acrylic interpolymers of polyacrylic acid and poly(methacrylic acid); acrylic interpolymers of polyacrylic acid and poly(methacrylamide); acrylic interpolymers of polyacrylic acid and methacrylic acid; poly(vinyl alcohol); poly(vinyl acetate); poly(vinylacetate-co-vinyl alcohol); polyvinyloxazolidone; polyvinylmethyloxazolidone; and mixtures of any two or more of the foregoing.

18. The animal litter of claim 14, wherein the dye is included in the aqueous coating solution in an amount of about 0.01% to about 5% by weight of the aqueous solution.

19. The animal litter of claim 14, wherein the aqueous solution includes about 20% to about 60% by weight water, prior to drying.

20. The animal litter of claim 14, wherein the water-soluble polymer is polyvinylpyrrolidone coated onto said core substrate in a thickness of about 1 mil to about 25 mils, and the pH-indicating material is included in the animal litter in an amount of about 5% to about 20% based on the total combined volume of animal litter.

21. The animal litter of claim 20, wherein the polyvinylpyrrolidone is partially hydrolyzed.

22. The animal litter of claim 21, wherein the polyvinylpyrrolidone has at least 50% of its monomer units hydrolyzed.

23. The animal litter of claim 22, wherein the polyvinylpyrrolidone has at least 75% of its monomer units hydrolyzed.

24. The animal litter of claim 23, wherein the polyvinylpyrrolidone has about 80% to about 90% of its monomer units hydrolyzed.

25. The animal litter of claim 14, wherein the water-absorbent particles comprise bentonite clay.

26. The animal litter of claim 14, wherein the water-absorbent particles comprise attapulgite clay.

27. The animal litter of claim 14, wherein the water-absorbent particles comprise Fullers Earth.

28. A method of manufacturing a pH-indicating material comprising coating an inert solid substrate with an aqueous solution of a film-forming amount of a water-soluble polymer, and an effective amount of a water-soluble pH-indicating dye; and drying the coating on said inert substrate to bind the dye to the substrate, within the water-soluble polymer.

29. The method of claim 28, wherein the substrate is a solid mineral; the water-soluble polymer is a partially hydrolyzed metal salt of polyvinylpyrrolidone; the aqueous coating composition includes about 40% to about 80% by weight polymer; and the coating composition contains a combination of methyl red and bromothymol blue.

30. In a method of detecting feline urologic syndrome including adding a pH-indicating material, having a color transition at a pH above about 7.6, to a cat litter in an amount sufficient for contact with urine when a cat urinates in said cat litter, and visually reading the pH-indicating material within about 24 hours of cat urine contact to determine if a color transition has occurred in the pH-indicating material, the improvement comprising the pH-indicating material comprising:
an inert core substrate;
a coating on said substrate formed from an aqueous solution of a water-soluble polymer and an effective amount, for color transition, of a water-soluble pH-indicating dye, dried in place on said core substrate.

* * * * *